US008164694B2

(12) United States Patent
Chuang

(10) Patent No.: US 8,164,694 B2
(45) Date of Patent: Apr. 24, 2012

(54) CHANNEL SCANNING METHOD

(75) Inventor: Ching-Hsiang Chuang, Sinshih Township, Tainan County (TW)

(73) Assignee: Himax Technologies Limited (TW)

( * ) Notice: Subject to any disclaimer, the term of this patent is extended or adjusted under 35 U.S.C. 154(b) by 1233 days.

(21) Appl. No.: 11/868,855

(22) Filed: Oct. 8, 2007

(65) Prior Publication Data
US 2009/0091662 A1     Apr. 9, 2009

(51) Int. Cl.
*H04N 5/455* (2006.01)
(52) U.S. Cl. ........................................... 348/726
(58) Field of Classification Search ............... 348/466
See application file for complete search history.

(56) References Cited

U.S. PATENT DOCUMENTS

| 5,946,052 A * | 8/1999 | Ozkan et al. ............ 348/555 |
| 6,049,695 A * | 4/2000 | Cottam .................... 725/151 |
| 2007/0130610 A1 * | 6/2007 | Aarnio et al. ............. 725/134 |
| 2008/0107011 A1 * | 5/2008 | Yang ....................... 370/203 |

* cited by examiner

*Primary Examiner* — Joseph P Hirl
*Assistant Examiner* — An Nguyen
(74) *Attorney, Agent, or Firm* — Hayes Soloway P.C.

(57) ABSTRACT

A method for operating a demodulator to demodulate a first channel is provided. The demodulator stores parameters of a second channel that is scanned before the first channel. The method comprises the following steps. First, the demodulator is reset. Second, an orthogonal frequency division multiplexing acquisition is processed to search Transmission Parameter Signaling and mode/guard interval parameters for the first channel and using the parameters of the second channel to process a forward error correction acquisition for the first channel. Third, a determining step is performed to determine whether or not the forward error correction for the first channel is locked and the Transmission Parameter Signaling for the first channel are not locked. Finally, the parameters of the second channel is used to demodulate the first channel when the forward error correction of the first channel is locked and the Transmission Parameter Signaling of the first channel are not locked.

25 Claims, 1 Drawing Sheet

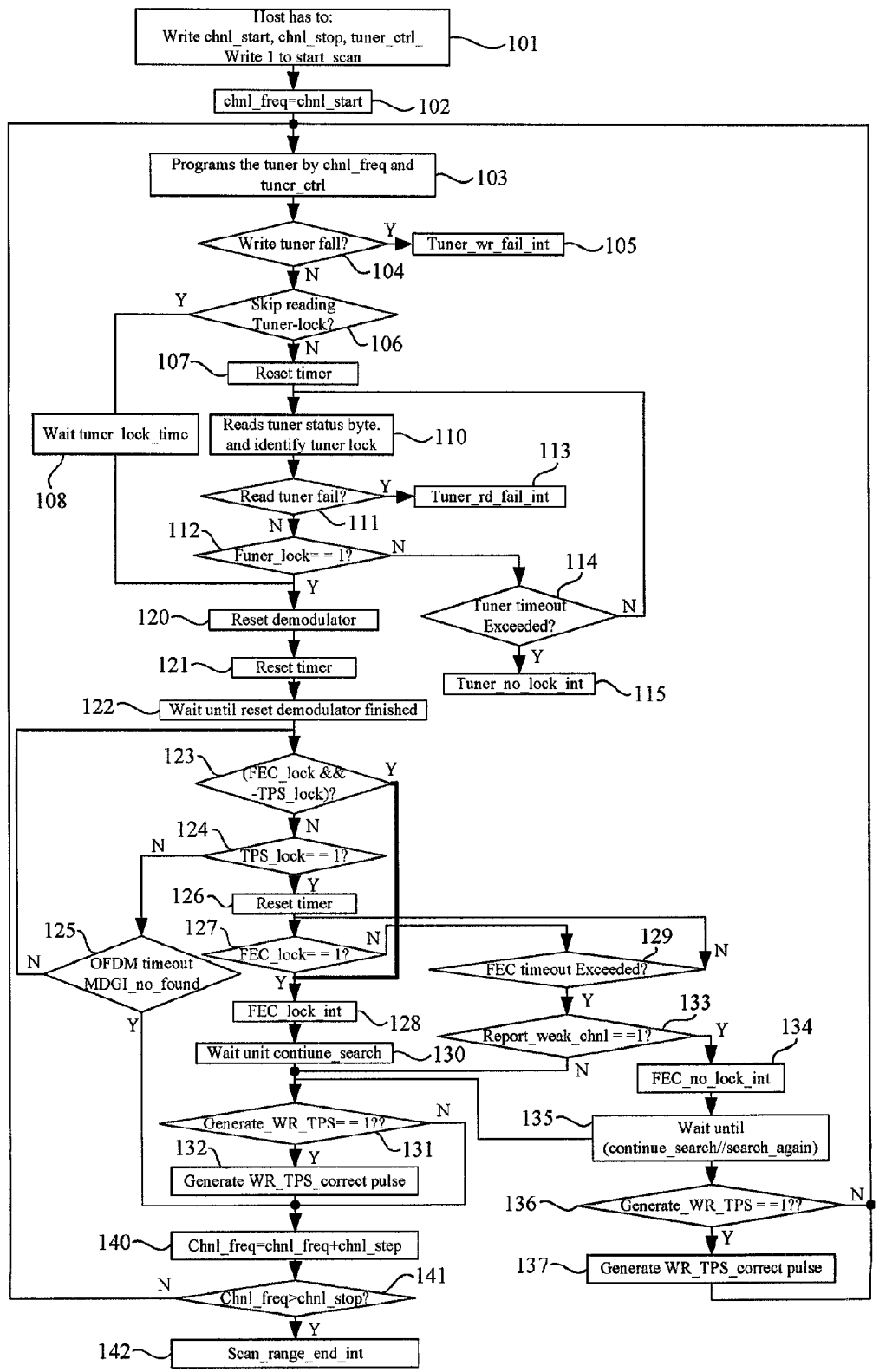

CHANNEL SCANNING METHOD

FIELD OF THE INVENTION

The present invention relates to a method for operating a demodulator, and in particular, to a method for operating a demodulator to scan channels.

BACKGROUND OF THE INVENTION

Generally, digital broadcasting receivers receive a range of frequency bands, that is, a plurality of broadcasting channels, and controls the tuner of a corresponding digital television to tune a main frequency to receive signals. The tuner sends received signals to a demodulator for further processing. After the demodulator finishes processing the signal, the receiver controls the tuner again to the next main frequency to receive signals.

Today, a short response time is required when the digital television switches channels. Therefore, a method that can reduce the tuning channel processing time and demodulating tuned channel signals is required.

SUMMARY OF THE INVENTION

Therefore, it is the main purpose of the present invention to provide a method for operating a demodulator to scan channels, which utilizes the prior channel parameters to demodulate the present channel to accelerate the scan speed.

According to a preferred embodiment, a method for operating a demodulator to demodulate a first channel is provided. The demodulator stores parameters of a second channel that is scanned before the first channel. The method comprises the following steps. First, the demodulator is reset. Second, an orthogonal frequency division multiplexing acquisition is processed to search Transmission Parameter Signaling and mode/guard interval parameters for the first channel and using the parameters of the second channel to process a forward error correction acquisition for the first channel. Third, to the demodulator determines whether or not the forward error correction for the first channel is locked and the Transmission Parameter Signaling for the first channel is not locked. Finally, the parameters of the second channel are used to demodulate the first channel when the forward error correction of the first channel is locked and the Transmission Parameter Signaling of the first channel is not locked.

Accordingly, the method can use the Transmission Parameter Signaling of the prior channel to demodulate the present channel to accelerate the scan speed.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein:

FIG. 1 is a flow chart for operating a demodulator to scan channels.

DETAILED DESCRIPTION OF THE PREFERRED EMBODIMENT

The preferred embodiments of the present invention are explained below with reference to the accompanying drawings. FIG. 1 is a flow chart for operating a demodulator to scan channels.

A host (not shown in this figure) has the following parameters: channel start (chnl_start), channel step (chnl_step), channel stop (chnl_stop) and tuner control (tuner_ctrl). The host writes 1 to start the scan in step 101. The parameter chnl_start is the frequency at which the host starts to scan the digital channel. The parameter chnl_step is the scan step units around the starting frequency. The parameter chnl_stop is the stopping frequency for scanning the digital channel. The parameter tuner_ctrl is to star the tuner.

When the starting frequency is set, the channel start (chnl_start) frequency is set to a channel frequency (chnl_freq) as the starting scan frequency in step 102. Next, the host programs a tuner based on the tuner control (tuner-ctrl) signal and writes channel frequency (chnl_freq), channel step (chnl_step) and channel stop (chnl_stop) to the tuner in step 103. That is the tuner searches for the first available channel by searching at scan step units (chnl_step) around the starting frequency. For example, the starting frequency is 470 MHz. The channel stop frequency is 650 MHz. The channel step frequency is 166 KHz. Therefore, the first available channel is searched by the tuner by moving from the starting frequency 470 MHz at 166 KHz scan steps.

Next, a determining step 104 is performed to determine whether the parameters of channel frequency (chnl_freq), channel step (chnl_step) and channel stop (chnl_stop) are correctly written into the tuner or not. When these parameters are not written into the tuner correctly, a fail signal (tuner_wr_fail_int) is transferred to the host to interrupt the scan process in step 105. On the other hand, when these parameters are written into the tuner correctly, a determining step 106 is performed to determine whether the step of reading the tuner_lock signal should be skipped or not. Because it is not necessary for some demodulators to read the tuner_lock signal, this step 106 is added to prevent these demodulators from being blocked when waiting for the tuner_lock signal.

When the demodulator used in the scan process is not required to read the tuner_lock signal, the step 108 is performed to wait for a predetermined time, called wait tuner_lock_time, and then, the step 109 is performed no matter whether or not the tuner_lock signal has been read by the demodulator in step 108.

When the demodulator used in the scan process is required to read the tuner_lock signal, the step 107 is performed to reset a timer. The timer counts a first predetermined time period that is an acceptable period for finishing the step of reading the tuner_lock signal. Next, in step 110, the demodulator may periodically read tuner status byte to identy whether or not the tuner has been locked, that is to identy the tuner_lock signal. Next, a determining step 111 is performed to determine whether or not the reading step 110 fails. When the reading step 110 fails, a fail signal (tuner_dr_fail_int) is transferred to the host to interrupt the scan process in step 113. On the other hand, when the reading step 110 does not fail, a determining step 112 is performed to determine whether or not the tuner has been locked, that is to determine whether or not the tuner_lock signal is equal to 1. When the tuner_lock signal is not equal to 1, a determining step 114 is performed to determine whether or not the predetermined time period has been counted by the timer. When the predetermined time period has been reached, that means that the tuner_lock signal is not read by the demodulator, a fail signal (tuner_no_lock_int) is transferred to the host to interrupt the scan process in step 115. When the predetermined time period has not been reached, step 110 to step 114 are repeatedly performed for the demodulator to read the tuner_lock signal.

When the tuner has been locked, the demodulator is reset in step 120. The main purpose of step 120 is to ensure that an Acquisituion sent from the demodulator is based on a stable intermediate frequency signal from the tuner. Because if the demodulator is not reset, once incorrect information sent from a non-stable tuner is used, a rework process has to be performed by the demodulator to repair the wrong information. Such rework processes consume a lot of time. Therefore, in the present invention, a reset demodulator step 120 is performed to prevent the demodulator from using information sent from a non-stable tuner.

Next, step 121 is performed to reset a timer. The timer counts a second predetermined time period that is an acceptable period for waiting for the MDGI_no_found signal response, which will be described in the following paragraphs. In step 122, the demodulator waits for a reset demodulator finished signal, called self_rst_n signal. In an embodiment, this signal will change from a low level to a high level when the demodulator is finished being reset.

According to the present invention, after the demodulator is reset, an orthogonal frequency division multiplexing acquisition is processed to search the Transmission Parameter Signaling and mode/guard interval parameters for the present channel. Because it is possible for two adjacent channels to use the same Transmission Parameter Signaling, the Transmission parameter Signaling of the prior channel that has been scanned are used to demodulate the present channel to accelerate the channel scanning speed.

In an embodiment, for example, a demodulator stores the Transmission parameter Signaling of a first channel that is scanned before the second channel. When the second channel is scanned, the demodulator uses the stored Transmission parameter Signaling of the first channel to demodulate the second channel. However, in other examples, if two adjacent channels do not use the same Transmission Parameter Signaling, the Transmission Parameter Signaling of the first channel can not be used to demodulate the second channel. To prevent the above case, in the present invention, a determining step 123 is performed to ensure the demodulator can use Transmission Parameter Signaling of the first channel to demodulate the second channel. Moreover, because a forward error correction acquisition process is faster than Transmission Parameter Signaling generating process for the second channel, the lock for the forward error correction acquisition is prior to the lock for Transmission Parameter Signaling. In other words, the Transmission Parameter Signaling of the first channel can be used to demodulate the second channel when the forward error correction acquisition of the second channel is locked. Therefore, a determining step 123 is performed to determine whether or not the forward error correction acquisition has been locked (FEC_lock) and the Transmission Parameter Signaling has not been locked (~TPS_lock) for the second channel.

It means that the first channel and the second channel have different Transmission Parameter Signaling when the forward error correction acquisition of the second channel can not be locked by using the Transmission Parameter Signaling of the first channel. Therefore, the demodulator waits for a new Transmission Parameter Signaling for the second channel. Step 124 determines whether or not the Transmission Parameter Signaling for the second channel has been locked.

When the Transmission Parameter Signaling for the second channel has not been locked, the step 125 is performed to determine whether or not the mode/guard interval not dound (MDGI_no_found) signal is generated or orthogonal frequency division multiplexing acquisition process is timeout. Typically, when there is no signal in a channel, the demodulator still has to perform the orthogonal frequency division multiplexing acquisition process, which wastes a lot of time.

However, in the orthogonal frequency division multiplexing acquisition process, the mode/guard interval (MDGI) parameter is generated first. An MDGI detector in the demodulator detects the MDGI parameter. If there is no signal in the channel, the MDGI parameter can not be generated and the MDGI_no_found signal is generated by the MDGI detector. Therefore, to save time, step 125 only detects the MDGI_no_ found signal. When the MDGI_no_found signal has been detected, the remaining processes of the orthogonal frequency division multiplexing acquisition are skipped by the demodulator. Then, step 140 searches for the next channel. On the other hand, when the MDGI_no_found signal has not been detected but the set time for processing the orthogonal frequency division multiplexing acquisition process is timed out, step 140 also searches for the next channel. The search frequency of this channel is equal to the present search frequency plus the channel step (chnl_freq=chnl_freq+chnl_ step). Next, in step 141, the search frequency is compared with the set channel stop (chnl_stop) frequency. When the search frequency is larger than the set channel stop frequency, the scan process is stopped and an interrupt signal, called scan_rang_ent_int signal, is sent to the host to stop the scan process in step 142. On the other hand, when the search frequency is less than the set channel stop frequency, the step 103 is performed again to start a new channel search.

On the other hand, when the MDGI_no_found signal has not been detected and the second acceptable time period has not been reached, step 123 and step 124 are repeatedly performed to check whether or not the first channel and the second channel have same Transmission Parameter Signaling (step 123) and whether or not the new Transmission Parameter Signaling for the second channel has been received when the first channel and the second channel have different Transmission Parameter Signaling (step 124).

When the new Transmission Parameter Signaling for the second channel has been received in step 124, the timer is reset in step 126 to count a third acceptable time period. Because the first channel and the second channel have different Transmission Parameter Signaling, the forward error correction acquisition is processed again using the Transmission Parameter Signaling for the second channel. Therefore, a determining step 127 is performed to check whether or not the forward error correction acquisition has been locked. If the forward error correction acquisition has not been locked, the step 129 is performed to check whether or not the third predetermined time period has been exceeded. If the third predetermined time period has not been exceeded in step 129, the step 127 is performed again to wait until the forward error correction acquisition been locked.

On the other hand, if the forward error correction acquisition has been locked, step 130 sends out a signal, called FEC_lock_int, to inform the host. Then, the host starts to read the demodulated signal of the second channel. After the host completes reading the demodulated signal of the second channel, a continue search signal (continue_search) is sent out from the host to the demodulator to continue the next channel search in step 130. signal.

Next, a step 131 is provided to a user to determine whether or not to store the Transmission Parameter Signaling of the second channel. If the user determines to store the Transmission Parameter Signaling of the second channel, a writing Transmission Parameter Signaling pulse (WR_TPS_correct) is generated in step 132 to write the Transmission Parameter Signaling into a memory in the demodulator. On the other hand, if the user determines not to store the Transmission Parameter Signaling of the second channel, the step 140 is performed to directly search for the next channel.

On the other hand, if the third predetermined time period has been exceeded in step 129, that is that the forward error correction acquisition process in step 127 is timeout, step 133 determines whether or not to report a weak channel signal (report_weak_signal) to the host. According to the flow chart, in the step 129, the second channel has successfully passed the orthogonal frequency division multiplexing acquisition and generates the Transmission Parameter Signaling. The Transmission Parameter Signaling for the second channel is correct. Therefore, the Transmission Parameter Signaling still can be stored for the next search. If the user does not report a weakweak channel signal to the host in step 133, that means the second channel search process is over and next channel search is started, step 131 is performed again to allow the user to decide whether or not to store the Transmission Parameter Signaling.

On the other hand, if the user decides to report a weak channel signal to the host in step 133, a forward error correction acquisition is not locked signal (FEC_no_lock_int) is sent to the host in step 134. Then, the host may send out a continue search signal (continue_search) or a search again (search_again) signal to the demodulator in step 135. If a continue search signal is sent out from the host, that means the second channel search process is over and the next channel search has started, step 131 is performed again to allow the user to decide whether or not to store the Transmission Parameter Signaling.

On the other hand, if a search again signal is sent out from the host, that means the second channel search process has to be performed again, step 136 is performed again to allow the user to decide whether or not to store the Transmission Parameter Signaling. If the user determines to store the Transmission Parameter Signaling of the second channel, a writing Transmission Parameter Signaling pulse (WR_TPS_correct) is generated in step 137 to write the Transmission Parameter Signaling into a memory in the demodulator. Next, step 103 is performed again to search the second channel again.

Accordingly, the present invention uses the Transmission Parameter Signaling of the prior channel to demodulate the present channel. It is not necessary to wait the Transmission Parameter Signaling lock. Therefore, the demodulating speed can be improved.

As is understood by a person skilled in the art, the foregoing descriptions of the preferred embodiments of the present invention are illustrations of the present invention rather than limitations thereof. Various modifications and similar arrangements are included within the spirit and scope of the appended claims. The scope of the claims should be accorded to the broadest interpretation so as to encompass all such modifications and similar structures. While preferred embodiments of the invention have been illustrated and described, it will be appreciated that various changes can be made therein without departing from the spirit and scope of the invention.

What is called is:

1. A method for operating a demodulator to demodulate a first channel, wherein the demodulator stores parameters of a second channel that is scanned before the first channel, the method comprising the steps:
   resetting the demodulator;
   processing an orthogonal frequency division multiplexing acquisition to search Transmission Parameter Signaling and mode/guard interval parameters for the first channel and using the parameters of the second channel to process a forward error correction acquisition for the first channel;
   determining whether or not the forward error correction for the first channel is locked and the Transmission Parameter Signaling for the first channel are not locked; and
   using the parameters of the second channel to demodulate the first channel when the forward error correction of the first channel is locked and the Transmission Parameter Signaling of the first channel are not locked.

2. The method of claim 1, further comprising to store the parameters of the second channel to demodulator after using the parameters of the second channel to demodulate the first channel, wherein the stored parameters comprises Transmission Parameter Signaling of the second channel.

3. The method of claim 1, wherein after using the parameters of the second channel to demodulate the first channel, further comprising to add a predetermined scan step to the frequency of the first channel to search the next channel.

4. The method of claim 1, further comprising continuously processing the orthogonal frequency division multiplexing acquisition to find Transmission Parameter Signaling and mode/guard interval parameters of the first channel when the forward error correction and the Transmission Parameter Signaling of the first channel are not locked.

5. The method of claim 4, further comprising:
   determining whether or not the Transmission Parameter Signaling of the first channel is locked;
   determining whether or not the mode/guard interval parameters of the first channel are found when the Transmission Parameter Signaling of the first channel are not locked; and
   stopping demodulating the first channel when the mode/guard interval parameters are not found.

6. The method of claim 5, further comprising:
   setting a first time period; and
   stopping demodulating the first channel when a time for finding the mode/guard interval parameters of the first channel is over the first time period.

7. The method of claim 6, wherein when a time for finding the mode/guard interval parameters of the first channel is not over the first time period, further comprising to repeatedly process an orthogonal frequency division multiplexing acquisition to search Transmission Parameter Signaling of the first channel.

8. The method of claim 5, further comprising to process a forward error correction acquisition to find forward error correction parameters of the first channel when the Transmission Parameter Signaling of the first channel are locked and to store the Transmission Parameter Signaling of the first channel to the demodulator after the Transmission Parameter parameters of the first channel are locked.

9. The method of claim 8, wherein after storing the Transmission Parameter Signaling of the first channel to demodulator, further comprising to add a predetermined scan step to the frequency of the first channel to search next channel.

10. The method of claim 8, further comprising:
    setting a second time period; and
    stopping processing the forward error correction acquisition when a time for finding the forward error correction parameters of the first channel is over the second time period.

11. The method of claim 10, wherein after stopping processing the forward error correction acquisition, further comprising to add a predetermined scan step to the frequency of the first channel to search next channel.

12. The method of claim 10, further comprising:
    report information of the forward error correction parameters not being found to a host;

storing the Transmission Parameter Signaling of the first channel to demodulator, and adding a predetermined scan step to the frequency of the first channel to search next channel.

13. A method for scanning a channel, the method comprising the steps:
setting a starting scan frequency, a scan step and a stopping scan frequency in a tuner;
searching for an available channel by searching the starting scan frequency by the tuner;
reset a demodulator when a first channel is locked by the tuner;
processing an orthogonal frequency division multiplexing acquisition to search Transmission Parameter Signaling and mode/guard interval parameters for the first channel and using parameters of a second channel to process a forward error correction acquisition for the first channel, wherein the parameters of the second channel that is scanned before the first channel are stored in the demodulator;
determining whether or not the forward error correction for the first channel is locked and the Transmission Parameter Signaling for the first channel are not locked;
using the parameters of the second channel to demodulate the first channel when the forward error correction of the first channel is locked and the Transmission Parameter Signaling of the first channel are not locked.

14. The method of claim 13, further comprising to store the parameters of the second channel to demodulator after using the parameters of the second channel to demodulate the first channel, wherein the stored parameters comprises Transmission Parameter Signaling of the second channel.

15. The method of claim 13, wherein after using the parameters of the second channel to demodulate the first channel, further comprising to add the scan step to the frequency of the first channel to search next channel.

16. The method of claim 13, further comprising to continuously process orthogonal frequency division multiplexing acquisition to find Transmission Parameter Signaling and mode/guard interval parameters of the first channel when the forward error correction and the Transmission Parameter Signaling of the first channel are not locked.

17. The method of claim 16, further comprising:
determining whether or not the Transmission Parameter Signaling of the first channel are locked;
determining whether or not the mode/guard interval parameters of the first channel are found when the Transmission Parameter Signaling of the first channel are not locked; and stopping demodulating the first channel when the mode/guard interval parameters are not found.

18. The method of claim 17, further comprising:
setting a first time period; and
stopping demodulating the first channel when a time for finding the mode/guard interval parameters of the first channel is over the first time period.

19. The method of claim 18, wherein when a time for finding the mode/guard interval parameters of the first channel is not over the first time period, further comprising to repeatedly processing an orthogonal frequency division multiplexing acquisition to search Transmission Parameter Signaling of the first channel.

20. The method of claim 17, further comprising to process a forward error correction acquisition to find forward error correction parameters of the first channel when the Transmission Parameter Signaling of the first channel are locked and to store the Transmission Parameter Signaling of the first channel to demodulator after the Transmission Parameter parameters of the first channel are locked.

21. The method of claim 20, wherein after storing the Transmission Parameter Signaling of the first channel to demodulator, further comprising to add the scan step to the frequency of the first channel to search next channel.

22. The method of claim 20, further comprising:
setting a second time period;
stopping processing the forward error correction acquisition when a time for finding the forward error correction parameters of the first channel is over the second time period; and
adding a predetermined scan step to the frequency of the first channel to search next channel.

23. The method of claim 22, further comprising:
report a information of the forward error correction parameters not being found to a host;
storing the Transmission Parameter Signaling of the first channel to demodulator; and
adding the scan step to the frequency of the first channel to search next channel.

24. The method of claim 13, wherein before resetting a demodulator, further comprising to determine whether or not the first channel is locked.

25. The method of claim 22, further comprising:
setting a third time period; and
stopping searching channels by the tuner when a time for locking the first channel is over the third time period.

* * * * *